J. H. Steele,
Spice Box.

No. 3691. Reissued Oct 26, 1869.

Witnesses.

J. H. Shumway

Michael Ryan

H.
Joseph Steele
Assignee of
W. A. Miles
Inventor

By Attorney

John E. Earle

United States Patent Office.

JOSEPH H. STEELE, OF NEW HAVEN, CONNECTICUT, ASSIGNEE OF WALLACE A. MILES.

*Letters Patent No.* 58,455, *dated October* 2, 1866; *reissue No.* 3,691, *dated October* 26, 1869.

DIVISION A.

IMPROVED SPICE-BOX.

The Schedule referred to in these Letters Patent and making part of the same.

*To all whom it may concern:*

Be it known that WALLACE A. MILES, of Meriden, in the county of New Haven, and State of Connecticut, invented a new and improved Spice-Box; and I do hereby declare the following, when taken in connection with the accompanying drawings, and the letters of reference marked thereon, to be a full, clear, and exact description of the same, and which said drawings constitute part of this specification, and represent, in—

Figure 1:
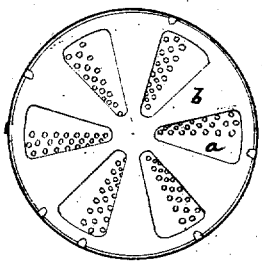

Figure 1, a top view, with the perforations partially opened; and in

Figure 2:
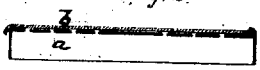

Figure 2, a central section of the same.

This invention relates to an improvement in sheet-metal spice-boxes, the object being to construct such boxes of the usual cylindrical form, so that they may be used as a dredge for sprinkling the contents of the box; and The invention consists in making one end of the box of double thickness, or of two plates, constructed so that the perforations in one may be opened or closed, at pleasure, by turning the other plate.

As here represented, *a* is one end of the box, perforated in any convenient manner.

*b* is a plate, placed over the end of the box, and slotted radially, and arranged so as to turn concentrically upon the end of the box, so as to open the perforations into the slots of the plate *b*, or to close the slots by the turning of the plate *b*.

Instead of the radial slots, the two plates may be perforated, the one corresponding to the other, so that when turned to a certain defined position, the perforations will open through each other into the box, and when returned, will close the perforations.

Practically, it is more convenient to place the turning-plate or register upon the outside of the end of the box, but it may be arranged upon the inside so as to operate in substantially the same manner, and it may be constructed to thus operate upon either end of the box, that is, the bottom or cover.

I claim, as the invention of the said WALLACE A. MILES—

In spice-boxes, the combination, in one end, of two plates, the one constructed so as to turn and register with the openings or perforations in the other plate, or close the same, as the case may be, in the manner substantially as herein set forth.

JOSEPH H. STEELE.

Witnesses:
J. H. SHUMWAY,
MICHAEL RYAN.